United States Patent
Uchida et al.

[11] Patent Number: 5,979,205
[45] Date of Patent: Nov. 9, 1999

[54] RING MANUFACTURING METHOD AND RING MANUFACTURING APPARATUS

[75] Inventors: Mitsutaka Uchida, Okazaki; Hiroyuki Ikuta, Nisshin, both of Japan

[73] Assignee: Aisin Seiki Kabushiki Kaisha, Aichi-pref., Japan

[21] Appl. No.: 09/105,277

[22] Filed: Jun. 26, 1998

[30] Foreign Application Priority Data

Jun. 30, 1997 [JP] Japan .................................. 9-174820

[51] Int. Cl.$^6$ .................................................. B21D 11/08
[52] U.S. Cl. .................................. 72/167; 72/168; 72/189
[58] Field of Search .......................... 72/167, 136, 168, 72/177, 88, 189

[56] References Cited

U.S. PATENT DOCUMENTS

| 3,036,622 | 5/1962 | Hitz ........................................... 72/168 |
| 4,545,229 | 10/1985 | Stephanenko ............................... 72/88 |

FOREIGN PATENT DOCUMENTS

| 16417 | 7/1965 | Japan ....................................... 72/167 |
| 648304 | 2/1979 | U.S.S.R. .................................. 72/136 |
| 678777 | 8/1989 | U.S.S.R. .................................. 72/136 |

OTHER PUBLICATIONS

Ikuta et al., Automobile Technology Society, Science Lecture Meeting Advance Notes 921 1992–5.

*Primary Examiner*—Daniel C. Crane
*Attorney, Agent, or Firm*—Hazel & Thomas

[57] ABSTRACT

A ring manufacturing method and a ring manufacturing apparatus according to the invention does not require the preparation of a specially shaped plate material for each type of ring plate to be manufactured. It is therefore possible to manufacture a ring plate of any thickness or width with a high degree of accuracy even in high-variety, low-volume production. In a plate material forming step, a round bar 1 is formed by rollers 3, 4 into a plate material having any desired cross-sectional shape. In a slant rolling step, the plate material is slant rolled by slant rollers 9, 10 and thereby formed into a specially shaped plate material whose thickness increases in the width direction from one side to the other. In a ring forming step, this specially shaped plate material is formed into a ring shape by a ring forming device 14. The specially shaped plate material can be formed on the ring forming production line, whereby the accuracy of the shape of the resulting ring is achieved without having to separately prepare a specially shaped plate material for each type of ring plate to be manufactured.

7 Claims, 6 Drawing Sheets

RING MANUFACTURING METHOD AND RING MANUFACTURING APPARATUS

BACKGROUND OF THE INVENTION

This invention relates to a method and an apparatus for manufacturing a ring with which it is possible to form a ring plate of any thickness, width, and internal and external diameter from the same starting rod material and which is suitable for high variety, low volume production.

Ring plates such as separating plates of wet multiplate clutches in automatic transmissions have generally been manufactured by being punched from a flat plate. However, with this method, the yield is poor. Also, while the realization of high performance and high quality in automobiles and the like has been progressing in recent years, a limit to reductions in cost has been reached.

To overcome this, a ring forming method has been proposed wherein a specially shaped plate material whose cross-section is tapered so that its thickness increases in the width direction from one side to the other is prepared and this specially shaped plate material is formed into the shape of a ring so that the thinner side thereof becomes the inner side and a ring having a uniform thickness is thereby obtained (Automobile Technology Society, Science Lecture Meeting Advance Notes 921 1992-5).

In this ring manufacturing method, deformation occurring in the formation of the ring is calculated, and the cross-sectional shape of the specially shaped plate material before it is formed into a ring is set so that the thickness, the width, and the internal and external diameters and so on of the ring plate being manufactured are obtained to a predetermined accuracy.

However, in the related art, this specially shaped plate material has been manufactured by drawing using a die. Consequently, when ring plates of various types having different thicknesses, widths, and internal and external diameters are to be manufactured, it has been necessary for different specially shaped plate material s to be selected and correspondingly different dies become necessary, and consequently high-variety, low-volume production has been expensive.

There have also been problems such as that:

(1) With a specially shaped plate material manufactured by drawing, because the working accuracy of an ordinary drawing die is about 0.05 mm and even with a drawing die worked using shape measurement about 0.02 mm as the limit, it is extremely difficult to obtain a highly accurate specially shaped plate material;

(2) Because the surface roughness of a drawn material is Rz=about 4.5, to obtain the surface roughness required of a ring plate, it is necessary for polishing or barreling to be carried out in a later step;

(3) With drawing, it is difficult to manufacture a thin plate and therefore drawing is not suitable for application to thin ring plates;

(4) With drawing, it is difficult to obtain a wide rod material; and (5) The cost of the starting material constitutes a large proportion of the production cost.

SUMMARY OF THE INVENTION

It is therefore an object of the present invention to provide a ring manufacturing method and a ring manufacturing apparatus with which it is not necessary to prepare a specially shaped plate material for each type of ring plate to be manufactured and with which it is possible to manufacture a ring plate of any thickness and width with high accuracy even in high variety, low volume production.

To achieve the above-mentioned object and other objects, the invention provides a ring manufacturing method comprising a plate forming step of forming a round bar into a plate material of any cross-sectional shape, a slant rolling step of slant rolling the plate material to form the plate material into a specially shaped plate material whose thickness increases in the width direction from one side to the other, and a ring forming step of so forming the specially shaped plate material into a ring shape that the thinner side of the specially shaped plate material becomes the inner side of the ring.

The invention also provides a manufacturing apparatus comprising flat plate forming means for forming a round bar supplied thereto into a plate material of any cross-sectional shape, slant rolling means for slant rolling the plate material to form the plate material into a specially shaped plate material whose thickness increases in the width direction from one side to the other, and ring forming means for so forming the specially shaped plate material into a ring shape that the thinner side of the specially shaped plate material becomes the inner side of the ring.

OPERATION

With the manufacturing method and apparatus provided by the invention, it is possible to manufacture many different rings from the same round bar. For each shape of the ring constituting the final product, the shape and dimensions of the specially shaped plate material and the dimensions of the ordinary plate material constituting the starting material are different. However, ordinary plate materials having different dimensions can be formed from one type of round bar. Therefore, it is possible to manufacture a target ring by forming an ordinary plate material and a specially shaped plate material suited to the shape and dimensions of the final product ring in a plate material forming step and a slant rolling step respectively and then finally forming this specially shaped plate material into a ring shape of a predetermined radius of curvature.

The setting of the plate material forming means for making the ordinary plate material and the specially shaped plate material needed to make a certain ring, the setting of the slant angle of the slant rolling means and the setting of the radius of curvature of the ring forming means can be carried out by an operator or automatically using a control computer and actuators.

In the manufacturing method of the invention, because a plate material of a cross-sectional shape suited to the type of the ring plate to be manufactured needed as the starting material of the ring forming step is obtained from the same round bar in the plate material forming step, it is not necessary for a specially shaped plate material to be prepared for each type of ring plate, nor is it necessary to change the round bar.

In the manufacturing method of the invention, the plate material forming step can have a step of adjusting the thickness of the plate material and a step of rolling the plate material in the width direction. In this case, preferably, in a width adjusting step, the round bar is rolled in a direction perpendicular to its axis and in a thickness adjusting step, it is rolled in its axial direction. By this means, it is possible to easily carry out adjustment of the width or thickness of the plate material. In the case of the width adjusting step, the width direction edges of the plate material may be thick.

Also, in the plate material forming step, a stepped plate material may be formed. The stepped plate material can have any suitably selected shape and may, for example, have a shape such that one half of the plate material is thicker than the other, or a shape such that a central part is recessed or projects out. From this stepped plate, a ring plate having a circumferential groove is obtained. When the plate material forming step is carried out with a roller member as a forming tool, by the roller member being given special groove shapes in predetermined positions, it is possible for grooves and projections to be formed in the radial direction of the ring also.

The manufacturing apparatus of the invention preferably has sensors for measuring in the production line any changes in the plate thickness or the plate width at the time of ring formation, and the width and the thickness of the cross-sectional shape of the plate material made by the plate material forming means. The slant imparted by the slant rolling means showing the degree to which the thickness of the plate material increases in the width direction from one side to the other is adjusted by automatic control or manual operation on the basis of results from these sensors.

The plate material forming means can be provided using a pair of rollers for rolling the round bar in a direction perpendicular to its axis. These rollers are mounted parallel to the axis of the round bar and reciprocated to the left and right to gradually increase the width of the bar.

As the ring forming means, preferably a roller type bending device having at least three rollers disposed in predetermined positions on the inner and outer sides of the ring is used. In this case, the internal and external diameters of the ring plate can be changed by changing the positions of the rollers.

In the manufacturing apparatus of the invention, a tensioner can be provided between the slant rolling means and the ring forming means. By this means, the tension of the starting material of the ring forming step can be kept constant, and variations in its shape can be suppressed and the amount of plate crown can be adjusted. This tensioner also functions as a buffer between the continuous rolling steps upstream and the intermittent rolling step downstream, and improves the accuracy of ring cutting carried out after ring formation.

The slant rolling means is preferably operated intermittently. When this is done, because the ring is stationary when the ring is cut, the cutting accuracy is better than when the ring is cut while moving.

DETAILED DESCRIPTION OF THE PREFERRED EMBODIMENTS

Preferred embodiment of the invention will now be described in detail with reference to the accompanying drawings.

First Preferred Embodiment

Figure 1:
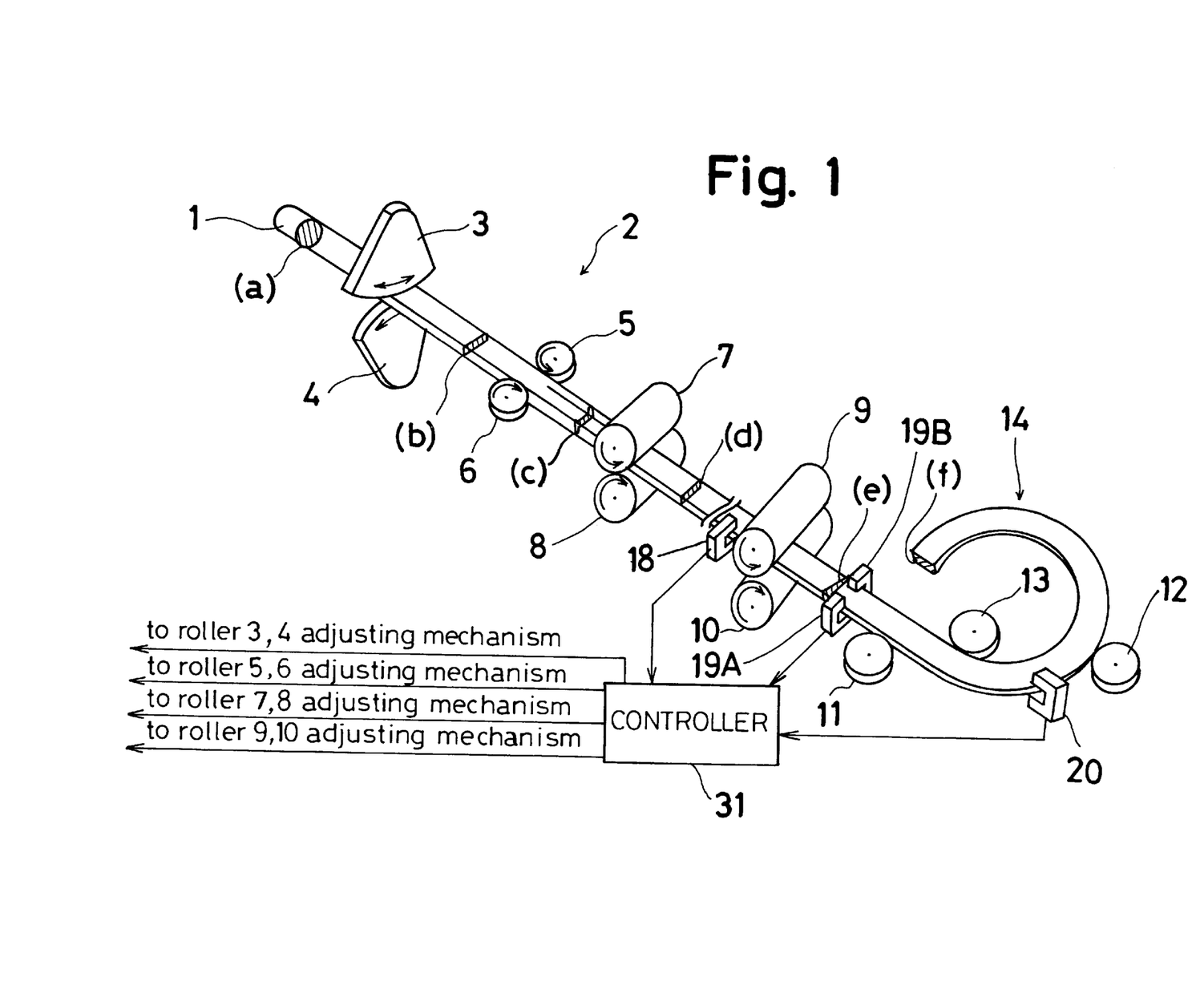
FIG. 1 is a schematic perspective view illustrating a manufacturing apparatus of a first preferred embodiment of the invention.

A manufacturing apparatus of a first preferred embodiment will be described with reference to FIG. 1. In FIG. 1, a metal round bar 1 is supplied from supplying means (not shown) to a manufacturing apparatus 2. The manufacturing apparatus 2 is made up of a pair of rollers 3, 4 for rolling the round bar 1 in a direction perpendicular thereto (a direction perpendicular to the axis of the round bar 1), rollers 5, 6 for rolling a plate material fed out from the rollers 3, 4 in its width direction, rollers 7, 8 for rolling the plate material in its thickness direction, slant rollers 9, 10 for rolling the plate material having their axes of rotation mutually inclined, and ring forming means 14 made up of a guide roller 11, a bending roller 12 and a mandrel roller 13.

Figure 2:
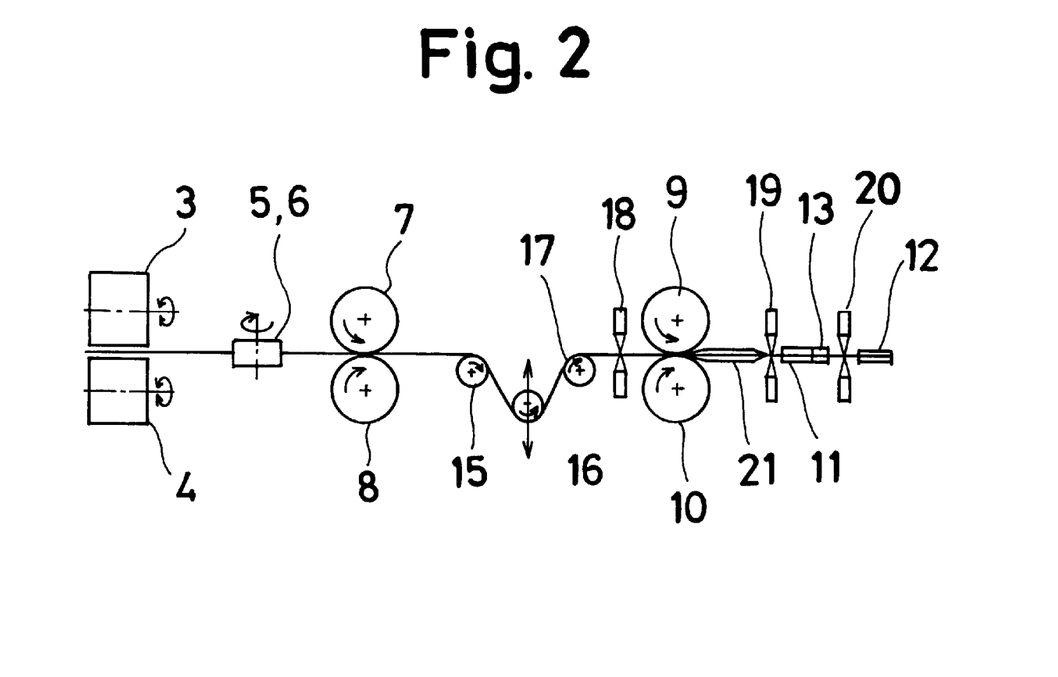
FIG. 2 is a schematic side view showing details of the manufacturing apparatus of FIG. 1.
Figure 3:
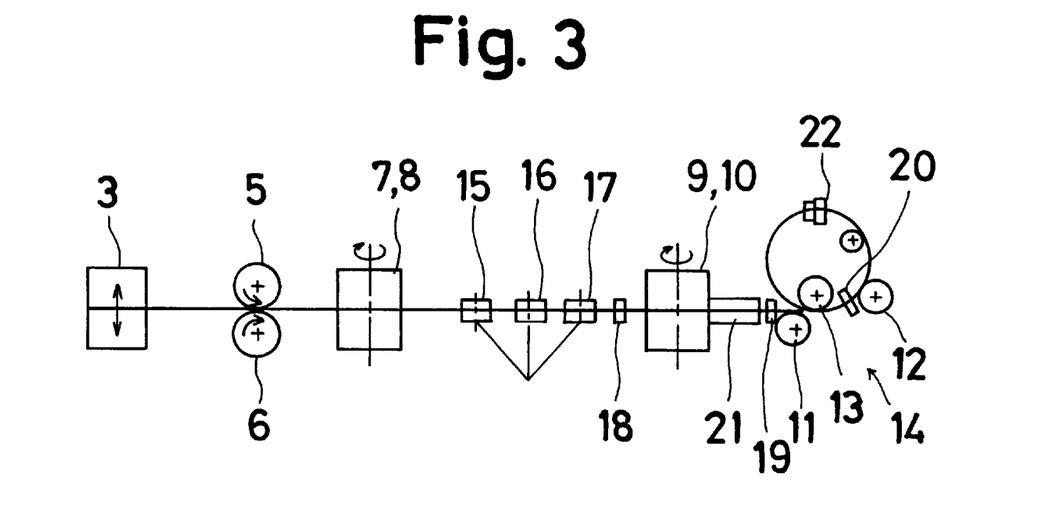
FIG. 3 is a schematic plan view of the manufacturing apparatus of FIG. 1.

A more detailed construction of the manufacturing apparatus 2 is shown in FIG. 2 and FIG. 3. As shown in FIGS. 1 through 3, the first stage rollers 3, 4 are mounted parallel with the axis (the feed direction) of the round bar 1 and these rollers 3, 4 reciprocate to the left and right centering on their axes of rotation in the same phase. The second stage rollers 5, 6 are mounted in the thickness direction of the plate material. The third stage rollers 7, 8 are mounted in the width direction of the plate material. These rollers 3 through 8 constitute flat plate forming means of the invention; the first stage carries out approximate width adjustment, the second stage carries out finer width adjustment, and the third stage carries out the forming of the plate material to an intermediate degree.

As shown in FIG. 2 and FIG. 3, a tensioner having a middle roller 16 of three rollers 15 through 17 as a tension roller is disposed between the rollers 7, 8 and the slant rollers 9, 10.

Figure 4:
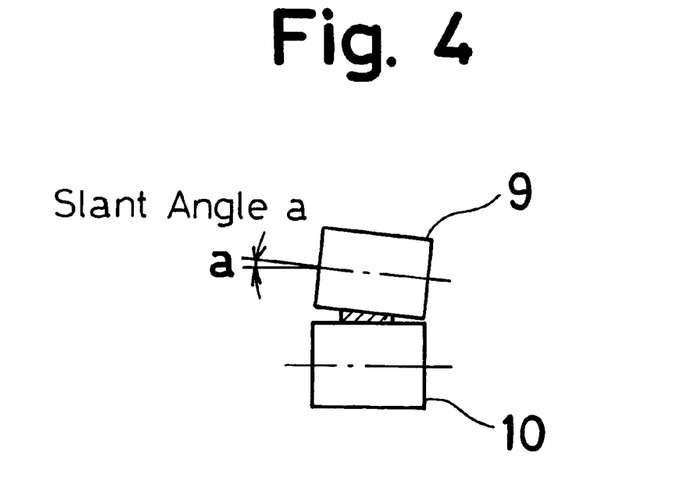
FIG. 4 is a view showing slant rollers for obtaining a slanted shape.

The slant rollers 9, 10 are mounted in the width direction of the plate material above and below the plate material in its thickness direction as shown in FIG. 4, and constitute slant rolling means of the invention. Here, the upper roller 9 is inclined at an angle a with respect to the lower roller 10, whose axis of rotation is horizontal, and forms a specially shaped plate material having a tapered cross-sectional shape (see FIG. 5e) corresponding to this slant angle α.

The ring forming means 14 following the slant rollers 9, 10 has the guide roller 11, the bending roller 12 and the mandrel roller 13 mounted in predetermine positions in the axial direction of the ring being manufactured and forms the specially shaped plate material into a ring shape.

A first plate thickness sensor 18 is disposed between the tensioner and the slant rollers 9, 10, a second plate thickness sensor 19 is disposed between an anti-buckling guide 21 provided on the exit side of the slant rollers and the guide roller 11, and a third plate thickness sensor 20 is disposed between the bending roller 12 and the mandrel roller 13. Outputs of these plate thickness sensors 18 through 20 are inputted into a controller 31, and signals for feedback control are supplied from the controller 31 to a rollers 3, 4 gap adjusting mechanism, a rollers 5, 6 gap adjusting mechanism and a rollers 7, 8 gap adjusting mechanism of the plate material forming means and to an inclination angle adjusting mechanism of the slant rollers 9, 10. In FIG. 2 and FIG. 3, the reference numeral 22 denotes a cutter.

A method for manufacturing a ring plate using this ring manufacturing apparatus 2 will now be described. The manufacturing method of this preferred embodiment consists mainly of a plate material forming step made up of width and thickness adjusting steps and a semi-finishing step, a slant rolling step for forming a specially shaped plate material, and a ring forming step for forming the specially shaped plate material into a ring shape.

Figure 5:
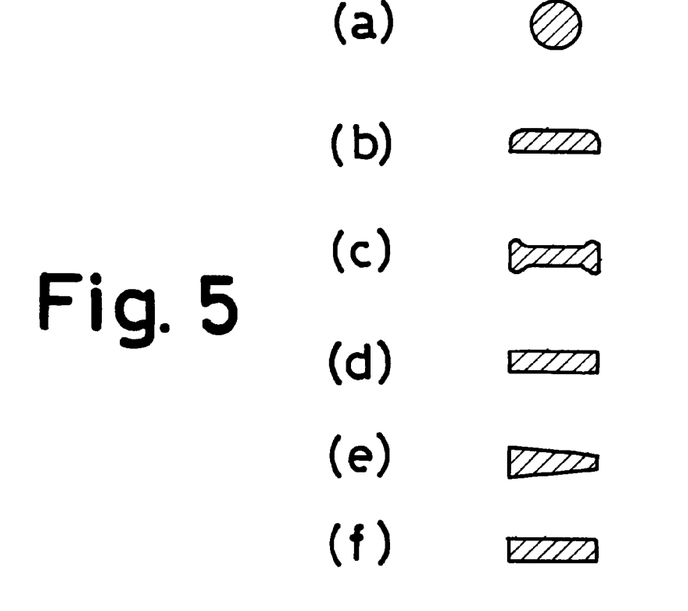
FIGS. 5A through 5F are views illustrating in order cross-sectional shapes of intermediate materials obtained in the first preferred embodiment of the invention.

In the width adjusting step, a round bar 1 having the cross-sectional shape shown by (a) in FIG. 5 is fed between the width adjusting rollers 3, 4 and is rolled in a direction perpendicular thereto by the operation of the rollers 3, 4. As a result, a plate material having the cross-sectional shape shown by (b) in FIG. 5 is obtained.

In the thickness adjusting step, the plate material from the rollers 3, 4 is rolled by the rollers 5, 6 in the width direction of the plate material and thereby made into a plate material having thick edges of the kind shown by (c) in FIG. 5. This thickness is provided to make the corner R of the ring plate smaller, and to raise the accuracy of the internal and external diameters and the accuracy of the plate width.

The plate material thus having had its width direction edges made thick is further formed to an intermediate finish by the rollers 7, 8. The semi-finished plate material has a substantially rectangular cross-sectional shape, as shown by (d) in FIG. 5.

The semi-finished plate material is pulled by the slant rollers 9, 10 to the slant rolling step while having its tension maintained by the tensioner. In this step, in anticipation of the plate thickness of the inner diameter side of the ring increasing and the plate thickness of the outer diameter side of the ring decreasing during the formation of the ring, the plate material is formed into a specially shaped plate material (see FIG. 5e) whose thickness increases in the width direction from one side to the other so that the plate thickness of the ring to be formed in the ring forming step is the same at the inner and outer diameter sides of the ring.

In the ring forming step, the specially shaped plate material passes through the anti-buckling guide 21 to the guide roller 11. The guide roller 11 guides the specially shaped plate material i n an inward direction. The mandrel roller 13 further guides the specially shaped plate material thus guided in the inward direction. By these two rollers 11, 13 and the bending roller 12, the specially shaped plate material is bent into a circle and formed into a ring shape. The specially shaped plate material thus formed into a ring shape is cut by a cutter 22 disposed in a predetermined position and becomes a ring plate having a uniform thickness in its width direction, as shown by (f) in FIG. 5.

To form a thin and wide ring plate, the gap between the rollers 3, 4 is made smaller, and this gap can be changed automatically by a key input operation to the controller 31 or manually by adjusting the rollers 3, 4 gap adjusting mechanism. By changing the positions of the rollers 11 through 13, it is possible to make the internal external diameters of the ring plate larger or smaller. When the internal and external diameters of the ring plate are made larger, the slant angle α of the roller 9 is made smaller and when the internal and external diameters of the ring plate are made smaller the slant angle α of the roller 9 is made larger. This can also be carried out automatically or manually.

In the manufacturing apparatus 2 and the manufacturing method of this preferred embodiment, the thickness and the width of the ring plate can be set freely by means of the width adjusting step carried out by the rollers 3, 4 and the thickness adjusting step carried out by the rollers 7, 8. Therefore, it is not necessary to prepare various specially shaped plate materials each specific to a different ring plate to be manufactured and it is possible to produce ring plates having various thicknesses and widths with high accuracy even in high variety, low volume production.

Also, (1) the width and the thickness of the plate material obtained can be freely changed by adjustment of the gap between the rollers 3, 4 and the gap between the rollers 7, 8. It is possible to manufacture even a plate material whose plate thickness is less than 0.2 of its plate width with a high degree of accuracy; and (2) the above-mentioned gaps can be controlled by means of the tensioner and measurement of the plate thickness. Accuracy can thereby be raised even further.

Second Preferred Embodiment

Figure 6:
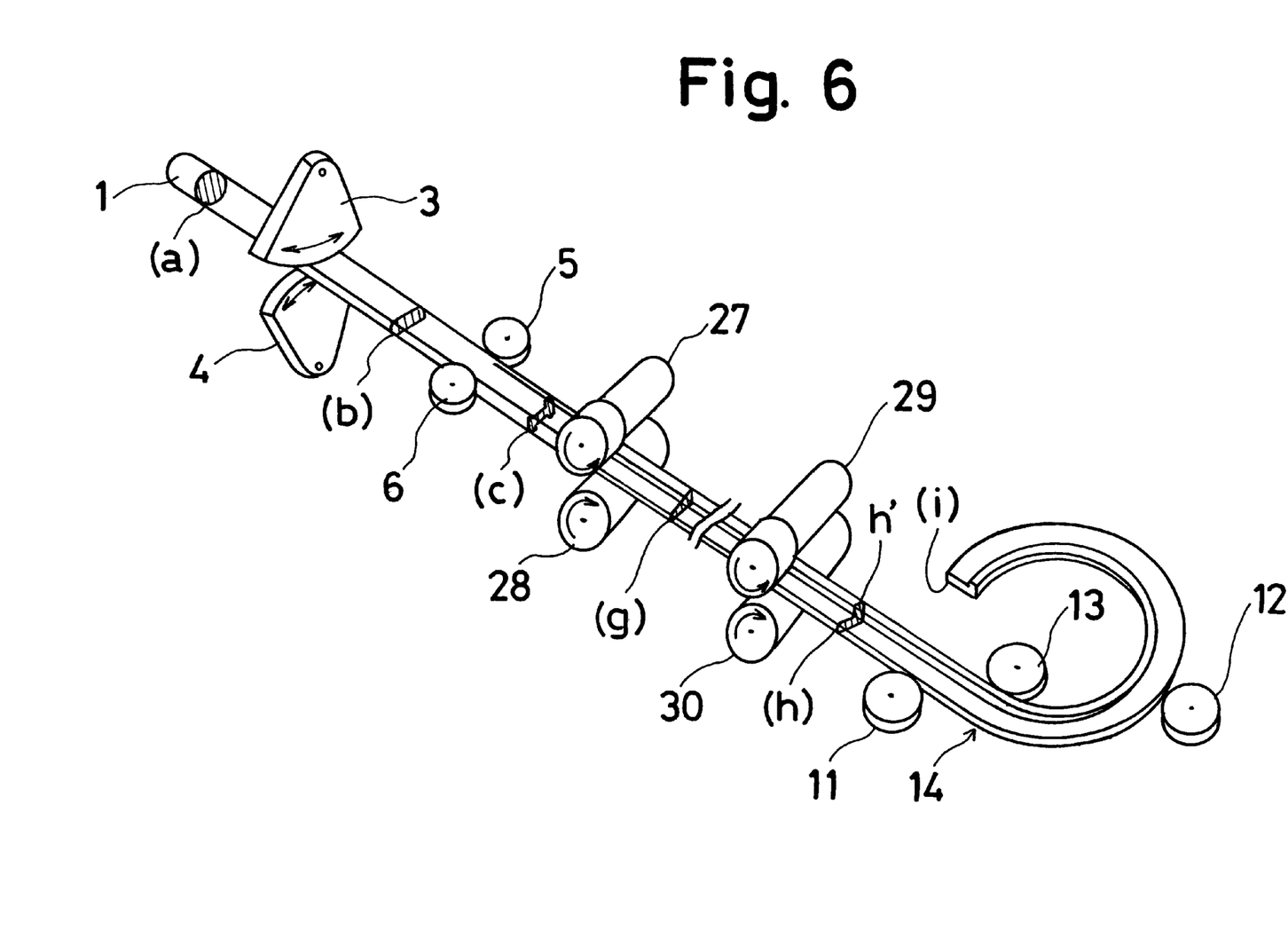
FIG. 6 is a schematic perspective view illustrating a manufacturing apparatus of a second preferred embodiment of the invention.

In a second preferred embodiment of the invention, as shown in FIG. 6, a large-diameter part and a small-diameter part with a step therebetween are provided in the axial directions of rollers 27, 28 for semi-finishing and a similar step is provided in slant rollers 29, 30.

Figure 7:
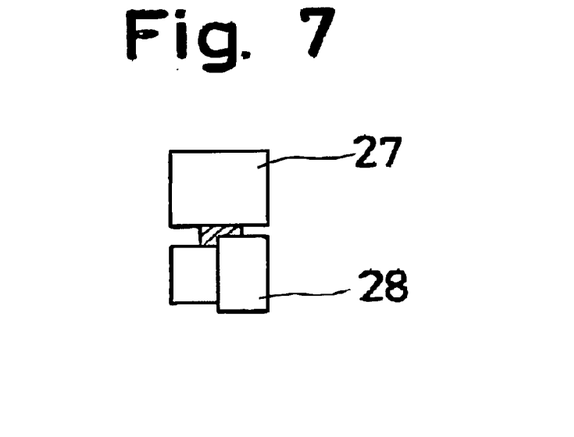
FIG. 7 is a view illustrating a method for obtaining a stepped plate material in the second preferred embodiment.

FIG. 7 shows the form of a plate material rolled by rollers 27, 28 having these steps, and as shown by (g) in FIG. 6 in the cross-sectional shape of a plate material obtained in this way, the thickness of one side can be enlarged and that of the other side reduced. The thick part h' of this kind of stepped plate material is given a slant by the stepped slant rollers 29, 30 similar to that formed by slant rollers 9, 10, whereby, as one of skill in the art would understand, the plate thickness of the ring to be formed in the ring forming step is the same at the outer diameter side of the ring and toward the stepped portion of the ring. When a specially shaped plate material having this cross-sectional shape (h) in FIG. 6 is formed into a ring, a ring plate having a circumferential groove like that shown with (i) in FIG. 6 is obtained.

Figure 8:
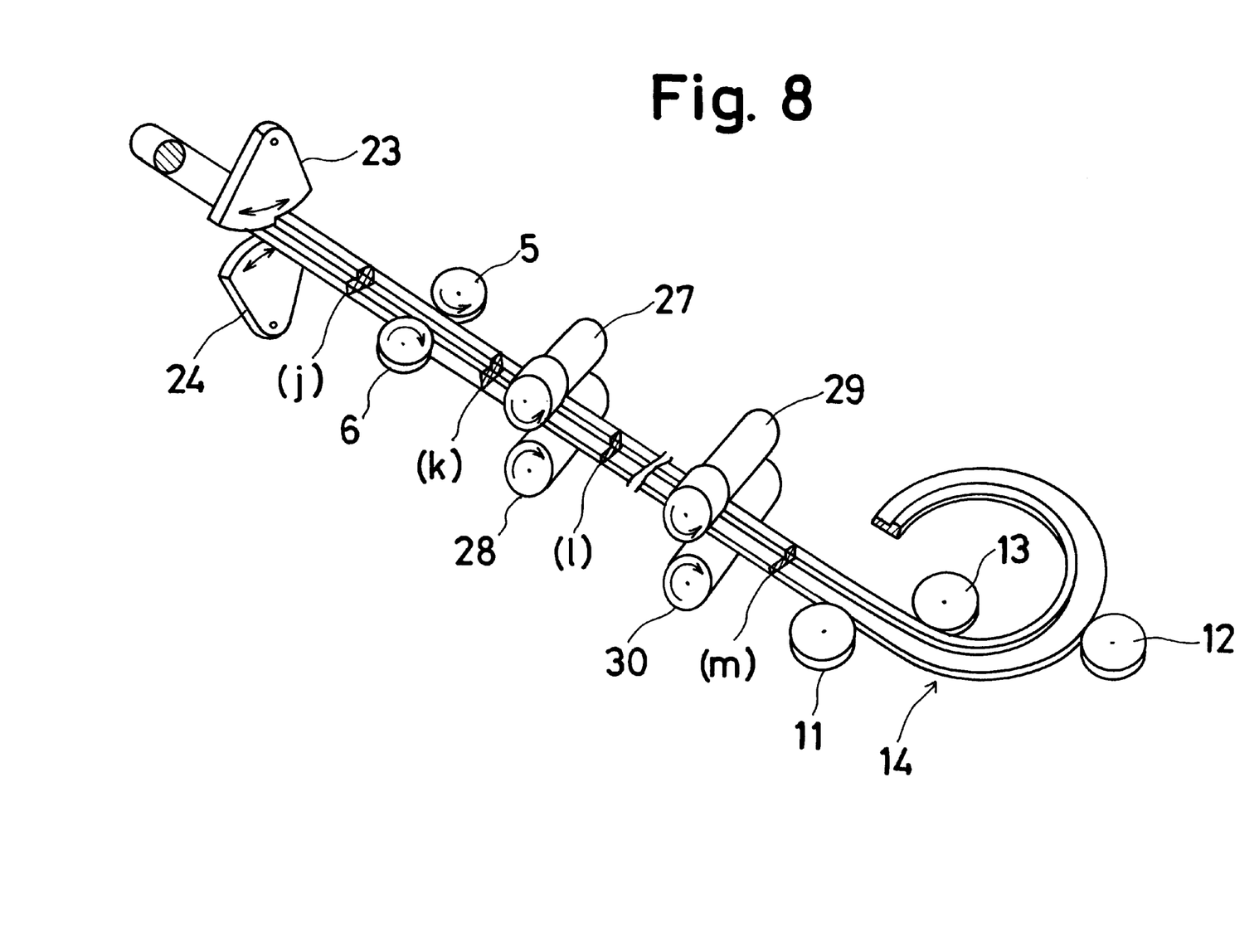
FIG. 8 is a schematic perspective view illustrating a manufacturing apparatus of a third preferred embodiment of the invention.

In a third preferred embodiment of the invention, as shown in FIG. 8, a step is provided in the plate material by rollers 23, 24 for width adjustment. Of the rollers 23, 24 in this case, the diameter of half of the arcuate face of the roller 23 is made large and the diameter of the other half is made small. The plate material obtained using these rollers 23, 24 has the stepped shape shown with (j) in FIG. 8. The semi-finishing rollers 27, 28 and the slant rollers 29, 30 are also made stepped.

With this third preferred embodiment also, as with the second preferred embodiment, it is possible to accurately form a ring plate having a circumferential groove.

Figure 9:
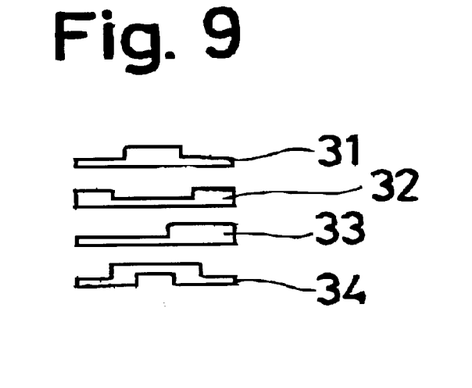
FIG. 9 is a view showing various stepped plates.

By suitably setting the shape of the rollers for width adjustment and so on, it is possible to form plate materials having various cross-sectional shapes, as shown by 31 through 34 of FIG. 9. With a plate material of shape 31 a ring plate having a circumferential groove in both sides thereof is obtained, and with the plate material of shape 32 a ring plate having a circumferential groove in the middle is obtained.

Figure 10:
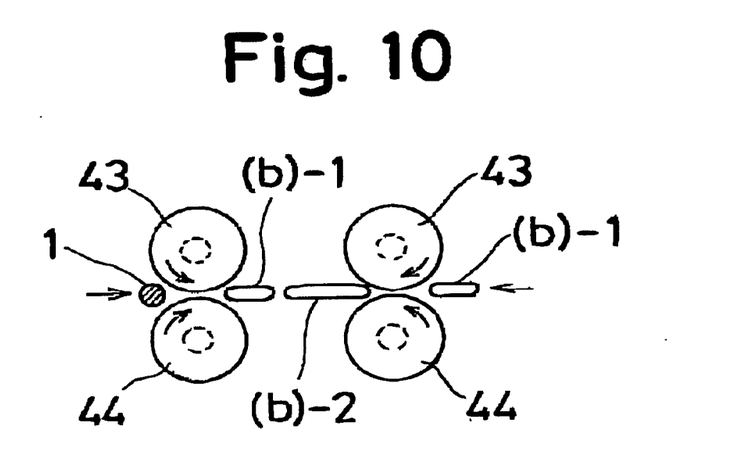
FIG. 10 is a view showing an alternative version of rollers for adjusting plate material width in the invention.

The rollers for thickness adjustment may be made disc-shaped rollers 43, 44. These rollers 43, 44 also are reciprocated to the left and right as shown with arrows in FIG. 10, and in the state on the left in the figure form the round bar 1 into a plate material (b)-1 of a predetermined width and when the rollers 43, 44 return to the state shown in the right side of the figure, a still wider plate material (b)-2 is formed.

Thus, in the second and third preferred embodiments, because a stepped plate material of a desired shape is formed from the round bar 1 and supplied to ring forming means, it is not necessary to prepare specially shaped plate materials of these shapes.

As described above, with the present invention, because a specially shaped plate material of any desired shape can be obtained from a round bar of a fixed shape, it is not necessary for a specially shaped plate material to be provided for every type of ring plate and it is possible to produce ring plates having various different thicknesses and widths with high accuracy in high-variety, low-volume production.

What is claimed is:

1. A ring manufacturing method comprising:
    a plate material forming step of forming a round bar into a plate material of predetermined cross-sectional shape;
    a slant rolling step of slant rolling the plate material to form a specially shaped plate material whose thickness increases in a width direction thereof from one side to the other so as to define at least a thin side in cross-section; and
    a ring forming step of forming the specially shaped plate material into a ring shape, wherein the thin side of the specially shaped plate material is positioned to become an inner side of the ring shape.

2. A ring manufacturing method according to claim 1, wherein the plate material forming step comprises a thickness adjusting step of adjusting the thickness of the plate material.

3. A ring manufacturing method according to claim 2, wherein the plate material forming step comprises a width adjusting step of rolling the plate material in the width direction.

4. A ring manufacturing method according to claim 1, wherein a stepped plate material is formed in the plate material forming step.

5. A ring manufacturing method according to claim 1, wherein the predetermined cross-sectional shape is a substantially rectangular cross-sectional shape.

6. A ring manufacturing method according to claim 1, wherein the predetermined cross-sectional shape is a stepped cross-sectional shape.

7. A ring manufacturing apparatus comprising:
    flat plate forming means for forming a round bar supplied thereto into a plate material of any predetermined cross-sectional shape;
    slant rolling means disposed for slant rolling the plate material to form the plate material into a specially shaped plate material whose thickness increases in a width direction from one side thereof to the other so as to define at least a thinner side in cross-section; and
    ring forming means for forming the specially shaped plate material into a ring shape, wherein the thinner side of the specially shaped plate material is positioned to become an inner side of the ring.

* * * * *